United States Patent
Jarosinski et al.

(10) Patent No.: US 7,333,614 B2
(45) Date of Patent: Feb. 19, 2008

(54) SYSTEM AND METHOD FOR ENCYPTING SPREAD SPECTRUM CARRIER

(75) Inventors: Tad Jarosinski, San Diego, CA (US); Daniel H. Agre, La Jolla, CA (US); Stephen S. Carter, San Diego, CA (US); Mehraban Iraninejad, Del Mar, CA (US); Joseph P. Odenwalder, Rancho Santa Fe, CA (US); Roy Franklin Quick, San Diego, CA (US); Charles E. Wheatley, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 748 days.

(21) Appl. No.: 09/991,506

(22) Filed: Nov. 16, 2001

(65) Prior Publication Data

US 2003/0095662 A1    May 22, 2003

(51) Int. Cl.
*H04N 7/167* (2006.01)
(52) U.S. Cl. .......... 380/268; 380/270; 380/31; 380/33; 380/37; 370/342
(58) Field of Classification Search ............ None
See application file for complete search history.

(56) References Cited

U.S. PATENT DOCUMENTS

| | | | |
|---|---|---|---|
| 5,060,265 A | 10/1991 | Finkelstein et al. | 380/46 |
| 5,727,064 A | 3/1998 | Reeds, III | |
| 5,742,678 A | 4/1998 | Dent et al. | |
| 5,771,288 A * | 6/1998 | Dent et al. | 380/270 |
| 6,044,388 A | 3/2000 | DeBellis et al. | 708/254 |
| 6,331,974 B1 * | 12/2001 | Yang et al. | 370/342 |
| 6,426,960 B2 | 7/2002 | Antonio | |
| 6,452,959 B1 * | 9/2002 | McDonough | 375/130 |
| 6,895,090 B1 * | 5/2005 | Gu | 380/46 |

FOREIGN PATENT DOCUMENTS

| | | |
|---|---|---|
| EP | 0752772 | 6/1996 |
| EP | 1049288 | 4/2000 |
| WO | 0024139 | 4/2000 |

OTHER PUBLICATIONS

Nguyen, L., 'Self-Encoded Spread Spectrum Communications', IEEE, May 1999, pp. 182-186, http://ieeexplore.ieee.org/iel5/6639/17706/00822668.pdf.*

* cited by examiner

*Primary Examiner*—Nasser Moazzami
*Assistant Examiner*—Ronald Baum
(74) *Attorney, Agent, or Firm*—Sandip S. Minhas; Thomas R. Rouse; Won Tae C. Kim

(57) ABSTRACT

A system and method for encrypting all channels of a wireless spread spectrum communication at the chip level. The PN sequence is encrypted with one or more encryption sequences and then used to spread the signal.

47 Claims, 4 Drawing Sheets

EXEMPLARY ENCRYPTION SEQUENCE GENERATOR

SYSTEM AND METHOD FOR ENCYPTING SPREAD SPECTRUM CARRIER

FEDERAL RESEARCH STATEMENT

The U.S. Government has a paid-up license in this invention and the right in limited circumstances to require the patent owner to license others on reasonable terms as provided by the terms of Contract No. MDA904-99-9-0001 awarded by the National Security Agency (NSA).

FIELD OF THE INVENTION

The present invention relates generally to the encryption of wireless communication, particularly as regards to spread spectrum communication such as but not limited CDMA and CDMA-type communications.

BACKGROUND OF THE INVENTION

Wireless terminals, such as but not limited to wireless telephones that communicate using Code Division Multiple Access (CDMA) spread spectrum modulation techniques, communicate over the air with system infrastructure using wireless over-the-air communication protocols, e.g., the CDMA protocols known as IS-95A, IS-95B, IS-2000, TD-SCDMA, Large Area Synchronous (LAS-CDMA), and W-CDMA. The system infrastructure, which can include base stations (BTS), base station controllers (BSC), and other components, connects the wireless terminal to another communication device, such as a land line or another wireless communication system.

To provide for secure communication using spread spectrum wireless systems, encryption principles can be used. For example, U.S. Pat. No. 5,727,064 discloses a method for secure communication that encrypts frames of communication (the data symbols, or payload) using a nonlinear scrambler. The scrambler is coupled to the output of the long code generator to remove linearity from the long code sequence produced by the long code generator. Portions of the long code sequence subsequently are combined with the main data signal that is output by the bit interleaver, thereby encrypting frames of data prior to spreading the frames in accordance with spread spectrum communication principles.

According to the '064 patent, breaking a nonlinear encryption is more difficult to do than breaking an encryption using a linear scrambler. As recognized herein, however, symbol-based encryption, even if nonlinear, remains vulnerable to eavesdropping because it is a relatively small and aligned data payload and is thus less cumbersome to break down and decrypt than a larger and non-aligned payload would be. Moreover, since the frames are encrypted in the above-mentioned patent, other system control channels, such as the synchronization and pilot channels are not encrypted. With the above considerations in mind, the present invention provides the solutions disclosed below.

SUMMARY OF THE INVENTION

A method for encrypting spread spectrum wireless communication is disclosed in which the complex-valued scrambling code, e.g., a pseudorandom number (PN) sequence that is used for spreading or scrambling the signal, is encrypted by complex multiplication with data chip sequences. Hence, the present invention essentially encrypts the entire communication, at what amounts to the chip level. As a consequence, the entire communication and not just individual frames or symbols must be broken down and analyzed by an eavesdropper to break the encryption.

Accordingly, a method for secure wireless communication using spread spectrum principles includes generating at least one pseudorandom number (PN) sequence, and encrypting the PN sequence to render an encrypted PN sequence. Using the encrypted PN sequence, a communication signal is spread and encrypted as a by-product of the spreading operation.

In a preferred, non-limiting embodiment, the communication signal is received from data modulation circuitry that may include a Walsh modulator. The PN sequence can be encrypted by combining the PN sequence with an encryption sequence (for less preferred BPSK modulation) or two encryption sequences (in the case of QPSK modulation). More encryption sequences as necessary can be used for 8-PSK modulation, QAM-16 modulation, QAM-64 modulation, and so on.

In a particularly preferred, non-limiting embodiment, the encryption sequence is generated by a DES encryption, such as triple-DES. In this exemplary embodiment, the DES encryption receives input including at least one multi-bit key and at least one time-varying input, such as but not limited to a long code state. If desired, the key periodically can be refreshed.

In another aspect, a wireless communication system includes a data modulation component that can include a channel coder that codes a communication signal for error correction to produce a coded signal, a bit interleaver for interleaving bits in the coded signal to produce an interleaved coded signal, and a Walsh modulator coupled to the bit interleaver to modulate the interleaved coded signal using a Walsh function. As set forth further below, a carrier modulator spreads the signal from the data modulation component with a pseudorandom number (PN) sequence that is encrypted with at least one encryption sequence.

In yet another aspect, a computer program product includes means for encrypting a PN sequence, and means for providing the PN sequence to a spread spectrum communication device for use thereof in spreading or despreading a communication signal.

In still another aspect, a chip for use in a communication device includes a data modulation component to produce a Walsh-modulated interleaved coded signal. A carrier modulator spreads the Walsh-modulated interleaved coded signal with a pseudorandom number (PN) sequence that is encrypted with at least one encryption sequence.

In another aspect, a chip for use in a communication device includes a PN sequence generator receiving at least one encryption sequence. The PN sequence is combined with the encryption sequence and sent to a despreading component to despread a received spread spectrum communication signal using the combined sequence to render a despread signal. Additional components demodulate, deinterleave, and decode the signal.

In another aspect, a method for secure wireless communication using spread spectrum principles includes receiving at least one encryption sequence, and using the encryption sequence to render an encrypted PN sequence. The method also includes using the encrypted PN sequence to despread a received spread spectrum signal to render a despread signal.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
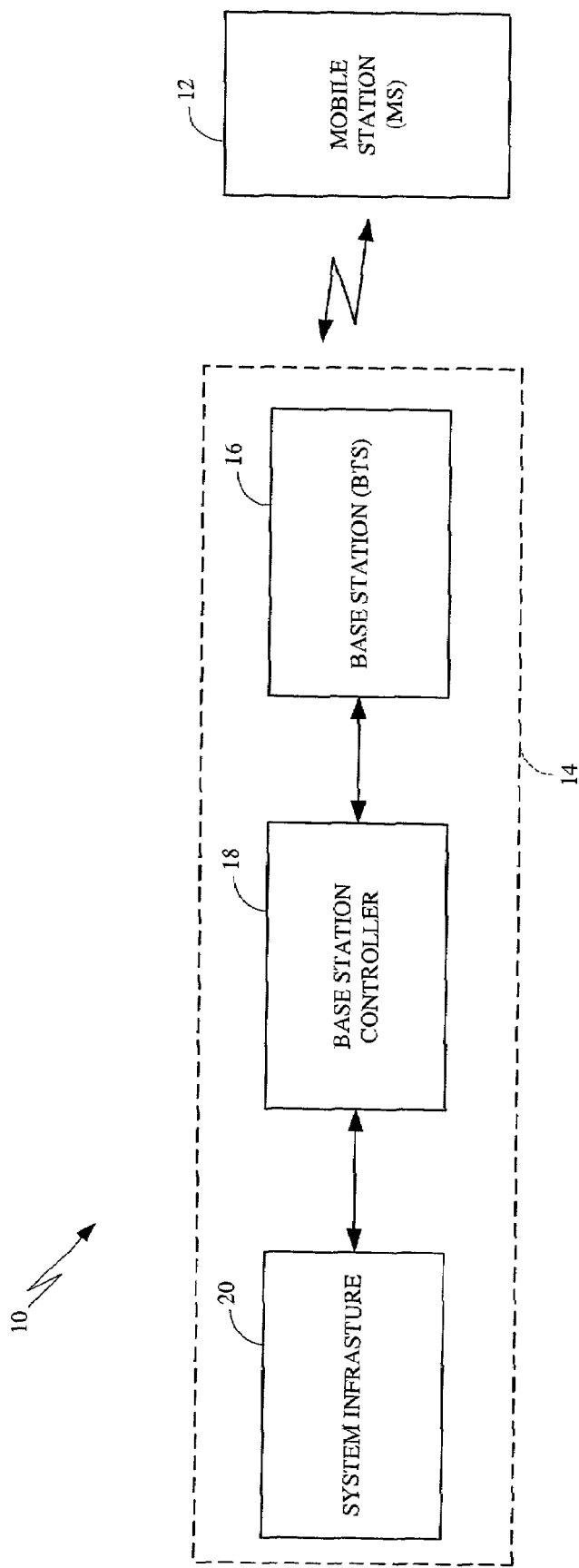
FIG. 1 is a block diagram of a presently preferred inventive wireless communication system.

Referring initially to FIG. 1, a system is shown, generally designated 10, for effecting communication between a wireless communication device 12, referred to herein as a "mobile station," and a telephony infrastructure 14 that includes, e.g., base stations (BTS) 16 (only one BTS 16 shown for clarity), base station controllers (BSC) 18, and additional infrastructure 20 in accordance with wireless communication principles known in the art.

In accordance with the present invention, the system 10 uses spread spectrum techniques. Accordingly, the mobile station 12 can use an over the air (OTA) protocol such as CDMA or WCDMA to communicate with the infrastructure 14. In one non-limiting embodiment the mobile station 12 is a mobile telephone made by Kyocera, Samsung, or other manufacturer that uses Code Division Multiple Access (CDMA) principles and CDMA over-the-air (OTA) communication air interface and includes protocols such as defined in but not limited to IS-95A, IS-95B, WCDMA, cdma-2000, IX, IXEV-DO, EV-DV, TD-SDMA, LAS-CDMA, and others to communicate with the infrastructure 14. As is known in the art, IS-95A and IS-95B are examples of spread spectrum protocols that use BPSK data modulation, whereas WCDMA, as an example, is a spread spectrum protocols that uses QPSK data modulation, i.e., split data streams with "I" and "Q" branches.

For instance, the wireless communication systems to which the present invention can apply, in amplification to those noted above, include Personal Communications Service (PCS) and the following digital systems: CDMA, WCDMA, and hybrid Time Division Multiple Access (TDMA)/CDMA technologies. A CDMA cellular system is described in the Telecommunications Industry Association/Electronic Industries Association (TIA/EIA) Standard IS-95. Other communications systems are described in the International Mobile Telecommunications System 2000/Universal Mobile Telecommunications Systems (IMT-2000/UM), standards covering what are referred to as wideband CDMA (WCDMA), cdma2000 (such as, cdma2000 1× or 3× standards, for example), TD-SCDMA, or LAS-CDMA.

The present invention applies to any spread spectrum mobile station 12; for illustration it will be assumed that the mobile station 12 is a telephone. In general, wireless communication devices to which the present invention applies may include but are not limited to a wireless handset or telephone, a cellular phone, a data transceiver, or a paging and position determination receiver, and can be hand-held, or portable as in vehicle-mounted (including cars, trucks, boats, planes, trains), as desired. However, while wireless communication devices are generally viewed as being mobile, it is to be understood that the present invention can be applied to "fixed" units in some implementations. Also, the present invention applies to data modules or modems used to transfer voice and/or data information including digitized video information, and may communicate with other devices using wired or wireless links. Further, the present invention applies to wireless, peer-to-peer communications. Moreover, commands might be used to cause modems or modules to work in a predetermined coordinated or associated manner to transfer information over multiple communication channels simultaneously. Wireless communication devices are also sometimes referred to as user terminals, mobile stations, mobile units, subscriber units, mobile radios or radiotelephones, wireless units, or simply as "users" and "mobiles" in some communication systems.

Figure 2A:
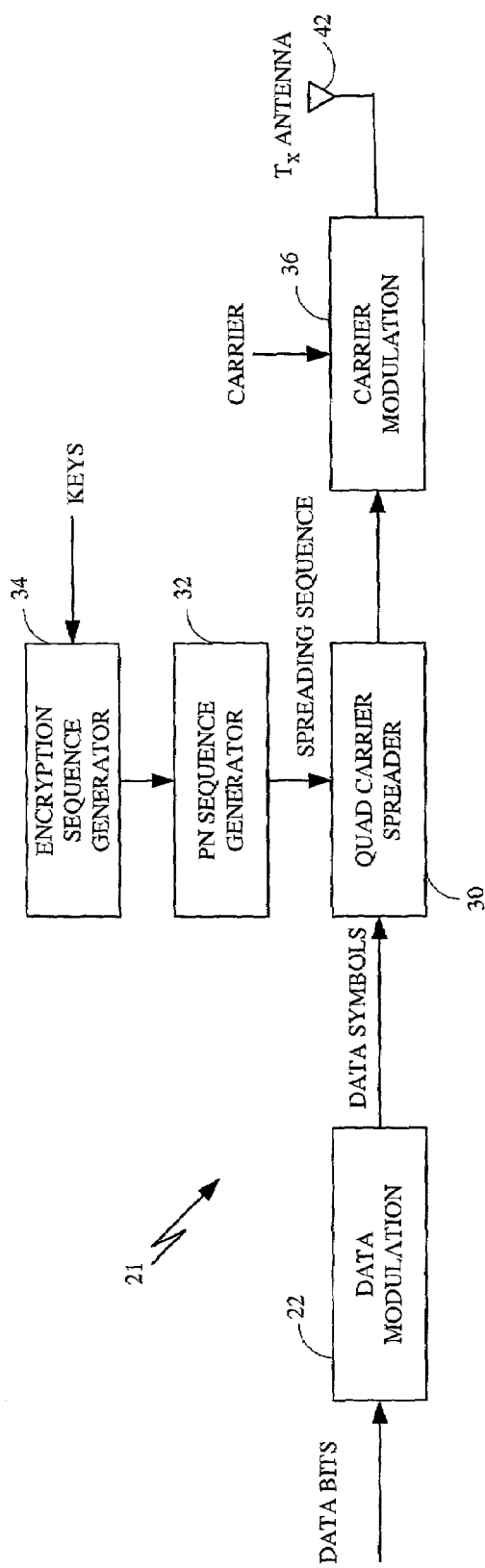
FIGS. 2A and 2B are block diagrams of the transmitting and receiving components, respectively, of a mobile station (MS) and/or the components of a base station (BTS) or other infrastructure component.
Figure 2B:
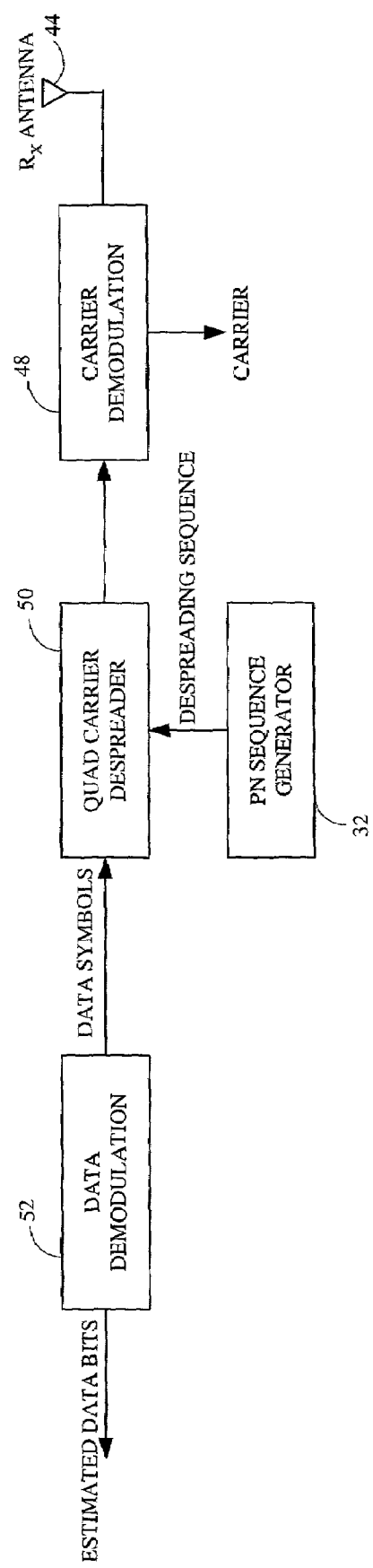

Now referring to FIGS. 2A and 2B, the components of the MS 12 and/or BTS 16 can be seen. That is, either one or both of the MS 12 and BTS 16 can use the present encryption invention in transmission, i.e., either one or both of the uplink (transmissions from the MS 12) or downlink (transmissions from the BTS 16 to the MS 12) can be encrypted with the same or different encrypted PN sequences. It should be noted that to further enhance security, frequency hopping may be employed. Also, not just the traffic channel, but other wireless channels such as pilot channels, synchronization or paging channels or access channels, can be encrypted. It is to be further understood that the BTS 16 can be combined in some systems with the BSC 18, or indeed in mobile switching center (MSC), gateway to a satellite system, or other infrastructure 14 component. Some or all of the components shown in FIG. 2 can be embodied in a chip, generally designated 21, or in software as more fully disclosed below in relation to FIGS. 4 and 5.

As shown, the chip 21 can include a data modulation component 22 that can include one or more of the following. The component 22 can include a voice coder when the chip 21 is incorporated in a mobile station for encrypting an uplink. The voice coder functions in accordance with wireless communication principles known in the art to generate a data stream representative of a speaker's voice.

The data modulation component 22 can also include a channel coder that receives the data from the voice coder or other component and codes the signal for error correction in accordance with wireless communication principles known in the art. The coded signal is sent to a bit interleaver of the data modulation component 22 which rearranges the order of the bits to reduce the effect of burst errors. From the bit interleaver, the signal can be sent to a Walsh modulator (or spreader) which Walsh-modulates the signal in accordance with wireless communication principles known in the art by multiplying the signal with a Walsh function.

The Walsh-modulated signal is then sent to a carrier spreader, e.g., a quadrature carrier spreader or binary carrier spreader 30 which spreads the signal in accordance with spread spectrum communication principles known in the art using a PN sequence. Specifically, the spreader 30 uses an encrypted PN spreading sequence from a PN sequence generator 32 to spread and encrypt the signal. As discussed further below, the PN sequence generator 32 receives from an encryption sequence generator 34 an encryption sequence (when BPSK principles are used), or two encryption sequences (when QPSK principles are used), or as appropriate more than two sequences for 8 bit, 16 bit, and QAM systems. As discussed further below, the encryption sequence generator 34 receives keys.

Once spread and encrypted, the signal is sent to an impulse modulator 36 that receives a carrier signal to modulate the signal for transmission. The signal can be shaped by a wave shaper if desired and then sent to a transmitter for transmission using an antenna 42.

In addition to the above-described transmitter portion, the chip 21 can also include a receiver portion, if desired. That is, if desired both the uplink and downlink can be encrypted, or only one side of the communication channel need be encrypted. For completeness, FIG. 2 shows a chip 21 that is configured with both a transmitter portion and receiver portion for two-way encryption.

Accordingly, a receiver antenna 44 is coupled to a processing/amplification component if desired in accordance with principles known in the art, and then the amplified signal is sent to an impulse demodulator 48 which receives a carrier signal for demodulation. The signal is then sent to a despreader 50 that can receive an encrypted PN sequence from the PN sequence generator 32 to despread the signal. It is to be understood that the encrypted PN sequence hypothesis for searching requires an a priori knowledge of estimated time from, e.g., GPS or other source of time information.

The signal is then processed by a data demodulation component 52 which can include a Walsh demodulator, a bit deinterleaver, and a channel decoder for respectively Walsh demodulating (or despreading) the signal, de-interleaving it, and decoding it in accordance with principles known in the art. When incorporated in a MS, the signal can be sent to a voice decoder to be transformed into an audible signal.

Figure 3:
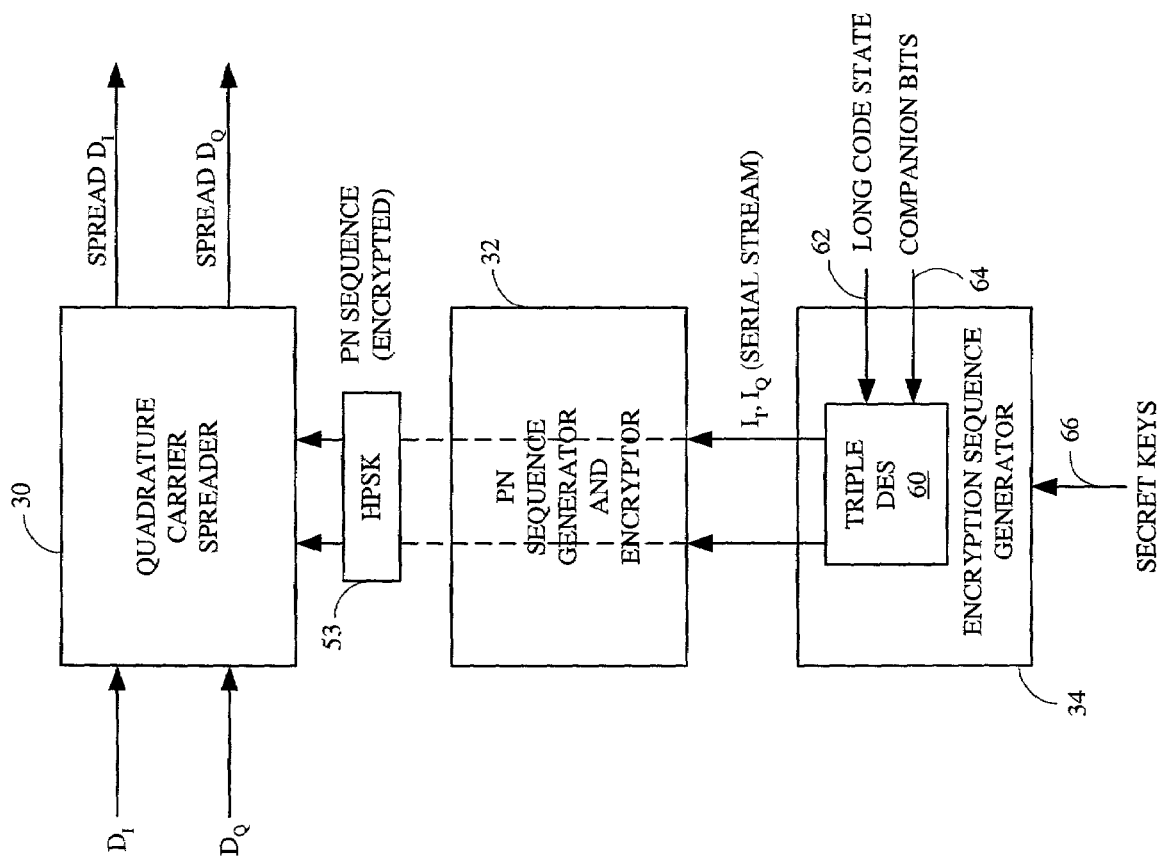
FIG. 3 is a block diagram of one preferred, non-limiting encryption sequence generator.

Having set forth the overall structure of one preferred, non-limiting chip 21, attention is now directed to FIG. 3, which shows an exemplary encryption sequence generator. It is to be understood that while FIG. 3 shows a circuit useful for QPSK encryption and, thus, shows two data streams and two encryption sequences, the principles of the present invention apply equally to BPSK (single stream) principles, as well as 8-PSK, 16-QAM, 64-QAM, and other schemes.

As shown, the spreader 30 can receive first and second data streams $D_I$ and $D_Q$ to produce respective first and second spread data streams using first and second encrypted PN sequences from the PN sequence generator 32. If desired, a HPSK component 53 can be interposed between the spreader 30 and PN sequence generator 32 to reduce peak to average performance. The first and second PN sequences are encrypted by combining a PN sequence with first and second encryption sequences from the encryption sequence generator 34. In one non-limiting, exemplary embodiment, the combination is effected by an XOR operation, although other methods for combining the PN sequence with an encryption sequence can be used.

A presently preferred, non-limiting encryption sequence generator 34 is illustrated in FIG. 3 as having a triple-DES component 60 which outputs first and second serial encryption sequences $I_I$, $I_Q$ based on one or more parallel bit inputs in accordance with triple-DES principles known in the art. Encryption components other than triple-DES, however, can be used.

In one illustrative, non-limiting embodiment, the inputs to the triple-DES can be any combination of select portions of a time varying input, such as but not limited to a long code state 62 with companion bits 64 if necessary, or any function thereof. Two sets of inputs such as but not limited to companion bits can be used to respectively establish the first and second encryption sequences $I_I$, $I_Q$. Multiple sets of inputs can be used to establish the encryption sequences for a forward link $I_I$, forward link $I_Q$, reverse link $I_I$, and reverse link $I_Q$.

Also, secret keys 66 can be input to the triple-DES. These keys 66 can be periodically changed, i.e., refreshed, by means known in the art without service disruption, so that even if the keys 66 are decrypted by an eavesdropper (which would take considerable time, given the chip-level encryption of the present invention), by the time they are decrypted new keys 66 will have been issued, rendering the old keys worthless for further decryption by the eavesdropper. Sixty four, 128, or fewer or more parallel bits can be used as the input to the block ciphers.

In the case of decryption, the PN sequence of the PN sequence generator 32 is combined with the encryption sequences $I_I$, $I_Q$ and then used to despread the received data signal.

Figure 4:
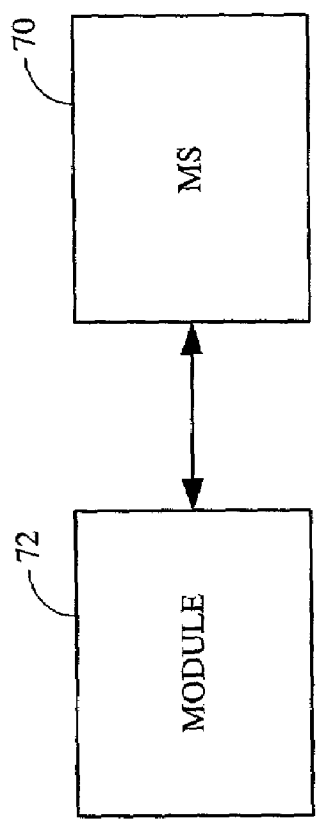
FIG. 4 is a schematic block diagram of a conventional mobile station that accesses a software layer to execute the present logic.

FIG. 4 shows that alternatively to a chip 21, a conventional spread spectrum MS 70 might access a software layer 72 embodying the present invention. With the above overview of the present architecture in mind, it is to be understood that the present logic is executed on the architecture shown in FIG. 4 in accordance with the flow chart of FIG. 5. The flow charts herein illustrate the structure of the logic of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer, controller, processor, etc.) to perform a sequence of function steps corresponding to those shown.

In other words, the logic may be embodied by a computer program that is executed by a processor within, e.g., the MS 70 as a series of computer- or control element-executable instructions. These instructions may reside, for example, in RAM or on a hard drive or optical drive, or the instructions may be stored on magnetic tape, electronic read-only memory, or other appropriate data storage device that can be dynamically changed or updated.

Figure 5:
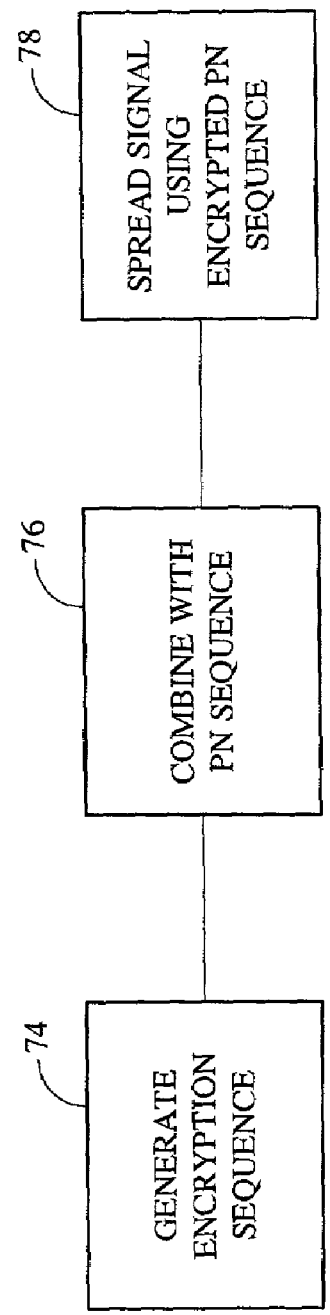
FIG. 5 is flow chart of the present encryption logic.

The logic shown in FIG. 5 generates the encryption sequence or sequences at block 74 in accordance with the above-disclosed principles. Moving to block 76, the encryption sequence(s) are combined with the PN sequence generated by a PN sequence generator, and then the data signal is spread at block 78 using the encrypted PN sequence.

While the particular SYSTEM AND METHOD FOR ENCRYPTING SPREAD SPECTRUM CARRIER as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act."

What is claimed is:

1. A method for secure wireless communication using spread spectrum principles, comprising:
   generating at least one pseudorandom number (PN) sequence;
   generating at least one encryption sequence based on at least one of key and time-varying input;
   combining the PN sequence with said encryption sequence to render an encrypted PN sequence; and
   using the encrypted PN sequence to spread a communication signal.

2. The method of claim 1, wherein the communication signal is received from a data modulation component including a Walsh modulator.

3. The method of claim 1, wherein the encryption sequence is generated by a data encryption standard (DES) component or a triple-DES component.

4. The method of claim 3, wherein the DES component or the triple-DES component receives at least one multi-bit key and at least one time-varying input.

5. The method of claim 4, wherein the at least one multi-bit key is periodically refreshed.

6. The method of claim 1, wherein the communication signal comprises a data symbol, and the method further comprises using the encrypting PN sequence to spread the data symbol.

7. An apparatus for secure wireless communication using spread spectrum principles, comprising:
   means for generating at least one pseudorandom number (PN) sequence;
   means for generating at least one encryption sequence based on at least one of key and time-varying input;
   means for combining the PN sequence with said encryption sequence to render an encrypted PN sequence; and
   means for using the encrypted PN sequence to spread a communication signal.

8. The apparatus of claim 7, wherein the communication signal is received from a data modulation component including a Walsh modulator.

9. The apparatus of claim 7, wherein the encryption sequence generating means comprises a data encryption standard (DES) component or a triple-DES component.

10. The apparatus of claim 9, wherein the DES component or the triple-DES component receives at least one multi-bit key and at least one time-varying input.

11. The apparatus of claim 10, wherein the at least one multi-bit key is periodically refreshed.

12. The apparatus of claim 7, wherein the communication signal comprises a data symbol, and the apparatus further comprises means for using the encrypting PN sequence to spread the data symbol.

13. An apparatus for secure wireless communication using spread spectrum principles, comprising:
   a pseudorandom number (PN) sequence generator configured to generate at least one PN sequence;
   an encryption sequence generator configured to generate at least one encryption sequence based on at least one of key and time-varying input and further configured to combine the PN sequence with the encryption sequence to render an encrypted PN sequence; and
   a spreader configured to use the encrypted PN sequence to spread a communication signal.

14. The apparatus of claim 13, wherein the communication signal is received from a data modulation component including a Walsh modulator.

15. The apparatus of claim 13, wherein the encryption sequence generator comprises a data encryption standard (DES) component or a triple-DES component.

16. The apparatus of claim 15, wherein the DES component or the triple-DES component receives at least one multi-bit key and at least one time-varying input.

17. The apparatus of claim 16, wherein the at least one multi-bit key is periodically refreshed.

18. The apparatus of claim 13 wherein the communication signal comprises a data symbol, and the spreader further configured to use the encrypting PN sequence to spread the data symbol.

19. A processor for secure wireless communication using spread spectrum principles, said processor being configured to:
   generate at least one pseudorandom number (PN) sequence;
   generate at least one encryption sequence based on at least one of key and time-varying input;
   combine the PN sequence with said encryption sequence to render an encrypted PN sequence; and
   use the encrypted PN sequence to spread a communication signal.

20. A computer-program product for secure wireless communication using spread spectrum principles, comprising:
   a computer-readable medium comprising instructions for causing a computer to:
   generate at least one encryption sequence based on at least one of key and time-varying input;
   combine the PN sequence with said encryption sequence to render an encrypted PN sequence; and
   use the encrypted PN sequence to spread a communication signal.

21. A method for secure wireless communication using spread spectrum principles comprising:
   generating at least one encryption sequence based on at least one of key and time-varying input;
   combining a PN sequence with the encryption sequence to render an encrypted PN sequence; and
   using the encrypted PN sequence to despread a received spread spectrum signal to render a despread signal.

22. The method of claim 21 further comprising:
   sending the despread signal to a Walsh demodulator.

23. The method of claim 21, wherein the encryption sequence is generated by a data encryption standard (DES) component or a triple-DES component.

24. The method of claim 23, wherein the DES component or triple-DES component receives at least one multi-bit key and at least one time-varying input.

25. The method of claim 24, wherein the multi-bit key is periodically refreshed.

26. The method of claim 24, wherein the time-varying input is at least one long code state.

27. The method of claim 21, wherein the received spread spectrum signal comprises a data symbol, and the method further comprises using the encrypting PN sequence to despread the data symbol to render a despread data symbol.

28. An apparatus for secure wireless communication using spread spectrum principles comprising:

an encryption sequence generator configured to generate at least one encryption sequence based on at least one of key and time-varying input;

a PN sequence generator configured to combine a PN sequence with the encryption sequence to render an encrypted PN sequence; and a despreader configured to use the encrypted PN sequence to despread a received spread spectrum signal to render a despread signal.

29. The apparatus of claim 28 further comprising:
a Walsh demodulator configured to receive a despread signal.

30. The apparatus of claim 28, wherein the encryption sequence generator comprises a data encryption standard (DES) component or a triple-DES component.

31. The apparatus of claim 30, wherein the DES component or triple-DES component receives at least one multi-bit key and at least one time-varying input.

32. The apparatus of claim 31, wherein the multi-bit key is periodically refreshed.

33. The apparatus of claim 31, wherein the time-varying input is at least one long code state.

34. The apparatus of claim 28, wherein the received spread spectrum signal comprises a data symbol, and the despreader further configured to use the encrypting PN sequence to despread the data symbol to render a despread data symbol.

35. An apparatus for secure wireless communication using spread spectrum principles comprising:
means for generating at least one encryption sequence based on at least one of key and time-varying input;
means for combining a PN sequence with the encryption sequence to render an encrypted PN sequence; and
means for using the encrypted PN sequence to despread a received spread spectrum signal to render a despread signal.

36. The apparatus of claim 35 further comprising:
means for sending the despread signal to a Walsh demodulator.

37. The apparatus of claim 35, wherein the generating means comprises a data encryption standard (DES) component or a triple-DES component.

38. The apparatus of claim 37, wherein the DES component or triple-DES component receives at least one multi-bit key and at least one time-varying input.

39. The apparatus of claim 38, wherein the multi-bit key is periodically refreshed.

40. The apparatus of claim 38, wherein the time-varying input is at least one long code state.

41. The apparatus of claim 35, wherein the received spread spectrum signal comprises a data symbol, and the apparatus further comprises means for using the encrypting PN sequence to despread the data symbol to render a despread data symbol.

42. A processor for secure wireless communication using spread spectrum principles, said processor being configured to:
generate at least one encryption sequence based on at least one of key and time-varying input;
combine a PN sequence with the encryption sequence to render an encrypted PN sequence; and
use the encrypted PN sequence to despread a received spread spectrum signal to render a despread signal.

43. A computer-program product for secure wireless communication using spread spectrum principles comprising:
a computer-readable medium comprising instructions for causing a computer to:
generate at least one encryption sequence based on at least one of key and time-varying input;
combine a PN sequence with the encryption sequence to render an encrypted PN sequence; and
use the encrypted PN sequence to despread a received spread spectrum signal to render a despread signal.

44. A base station for secure wireless communication using spread spectrum principles, comprising:
an antenna;
a pseudorandom number (PN) sequence generator configured to generate at least one PN sequence;
an encryption sequence generator configured to generate at least one encryption sequence based on at least one of key and time-varying input and further configured to combine the PN sequence with the encryption sequence to render an encrypted PN sequence; and
a spreader configured to use the encrypted PN sequence to spread a communication signal transmitted over the antenna.

45. A user terminal for secure wireless communication using spread spectrum principles, comprising:
an antenna;
a pseudorandom number (PN) sequence generator configured to generate at least one PN sequence;
an encryption sequence generator configured to generate at least one encryption sequence based on at least one of key and time-varying input and further configured to combine the PN sequence with the encryption sequence to render an encrypted PN sequence; and
a spreader configured to use the encrypted PN sequence to spread a communication signal transmitted over the antenna.

46. A base station for secure wireless communication using spread spectrum principles comprising:
an antenna;
an encryption sequence generator configured to generate at least one encryption sequence based on at least one of key and time-varying input;
a PN sequence generator configured to combine a PN sequence with the encryption sequence to render an encrypted PN sequence; and
a despreader configured to use the encrypted PN sequence to despread a spread spectrum signal received using the antenna to render a despread signal.

47. A user terminal for secure wireless communication using spread spectrum principles comprising:
an antenna;
an encryption sequence generator configured to generate at least one encryption sequence based on at least one of key and time-varying input;
a PN sequence generator configured to combine a PN sequence with the encryption sequence to render an encrypted PN sequence; and
a despreader configured to use the encrypted PN sequence to despread a spread spectrum signal received using the antenna to render a despread signal.

* * * * *